(12) United States Patent
Skinner

(10) Patent No.: US 6,233,746 B1
(45) Date of Patent: May 22, 2001

(54) MULTIPLEXED FIBER OPTIC TRANSDUCER FOR USE IN A WELL AND METHOD

(75) Inventor: Neal G. Skinner, Lewisville, TX (US)

(73) Assignee: Halliburton Energy Services, Inc., Dallas, TX (US)

(*) Notice: Subject to any disclaimer, the term of this patent is extended or adjusted under 35 U.S.C. 154(b) by 0 days.

(21) Appl. No.: 09/273,818

(22) Filed: Mar. 22, 1999

(51) Int. Cl.[7] ............................. G01J 4/00; G01V 5/00
(52) U.S. Cl. ............................. 2/227.18; 250/254
(58) Field of Search .................. 250/227.18, 227.21, 250/227.23, 231.19, 253, 254, 256, 269.1; 385/10, 12, 13

(56) References Cited

U.S. PATENT DOCUMENTS

| | | |
|---|---|---|
| 4,678,909 | 7/1987 | Jackson et al. |
| 4,748,686 | 5/1988 | Glomb. |
| 4,761,073 | 8/1988 | Meltz et al. |
| 4,806,012 | 2/1989 | Meltz et al. |
| 4,848,872 | 7/1989 | Shigematsu et al. |
| 4,932,263 * | 6/1990 | Wlodarczyk ............... 73/705 |
| 5,394,488 | 2/1995 | Fernald et al. |
| 5,399,854 | 3/1995 | Dunphy et al. |
| 5,426,297 | 6/1995 | Dunphy et al. |
| 5,488,475 | 1/1996 | Friebele et al. |
| 5,528,367 | 6/1996 | Putnam et al. |
| 5,748,312 * | 5/1998 | Kersy et al. ............... 356/345 |
| 5,828,059 * | 10/1998 | Udd ..................... 250/227.18 |
| 5,841,131 | 11/1998 | Schroeder et al. |
| 5,844,667 * | 12/1998 | Moran ..................... 365/35.5 |
| 5,877,426 * | 3/1999 | Hay et al. ................. 73/733 |
| 5,892,860 * | 4/1999 | Maron et al. ................ 385/12 |
| 5,925,879 * | 7/1999 | Hay ................... 250/227.14 |
| 5,987,197 * | 11/1999 | Kersy .................... 385/24 |
| 6,009,216 * | 12/1999 | Pruett et al. ................ 385/12 |
| 6,016,702 * | 1/2000 | Maron .................... 73/705 |
| 6,160,762 * | 12/2000 | Luscombe et al. ........... 367/149 |

FOREIGN PATENT DOCUMENTS

| | | |
|---|---|---|
| WO 98/29717 | 7/1998 | (WO). |
| WO 98/31987 | 7/1998 | (WO). |
| WO 98/35208 | 8/1998 | (WO). |
| WO 99/00652 | 1/1999 | (WO). |
| WO 99/02953 | 1/1999 | (WO). |

OTHER PUBLICATIONS

CIDRA; Web page entitled "CiDRA Fiber Optic Technology", URL: www.cidra.com; date unknown; pp. 1–3.
Hewlett Packard: HP 71450B, 71451B, and 71452B Optical Spectrum Analyzers—Technical Specifications; copyright 1995; 8 pages.
Hewlett Packard; Optical Spectrum Analysis—Application Note 1550–4; Jan., 1996; 33 pages.

* cited by examiner

Primary Examiner—Georgia Epps
Assistant Examiner—Saeed Seyrafi
(74) Attorney, Agent, or Firm—Paul I. Herman; James J. Murphy

(57) ABSTRACT

An optic sensor for use in a well is provided. The sensor can be configured to sense downhole conditions, such as temperature, pressure, or stress, either individually or in combination. The optic sensor has a sensor housing that defines a chamber. The sensor housing also defines a region that is responsive to an external force. An optic fiber extends through the housing. The optic fiber has a dielectric boundary that resides within the housing chamber, and has a refractive index variation that provides maximum reflectivity at a central reflectivity wavelength, the central reflectivity wavelength correspondingly shifting with respect to an expansion or contraction of the region. In a further aspect of the invention, the optic fiber has a second dielectric boundary spaced apart from the first dielectric boundary. The second dielectric boundary is within the chamber and has a refractive index variation that provides maximum reflectivity at a central reflectivity wavelength sufficiently dissimilar to the first dielectric boundary. The second dielectric boundary floats in the cavity such that the second dielectric boundary is responsive to a temperature change within the sensor housing.

19 Claims, 3 Drawing Sheets

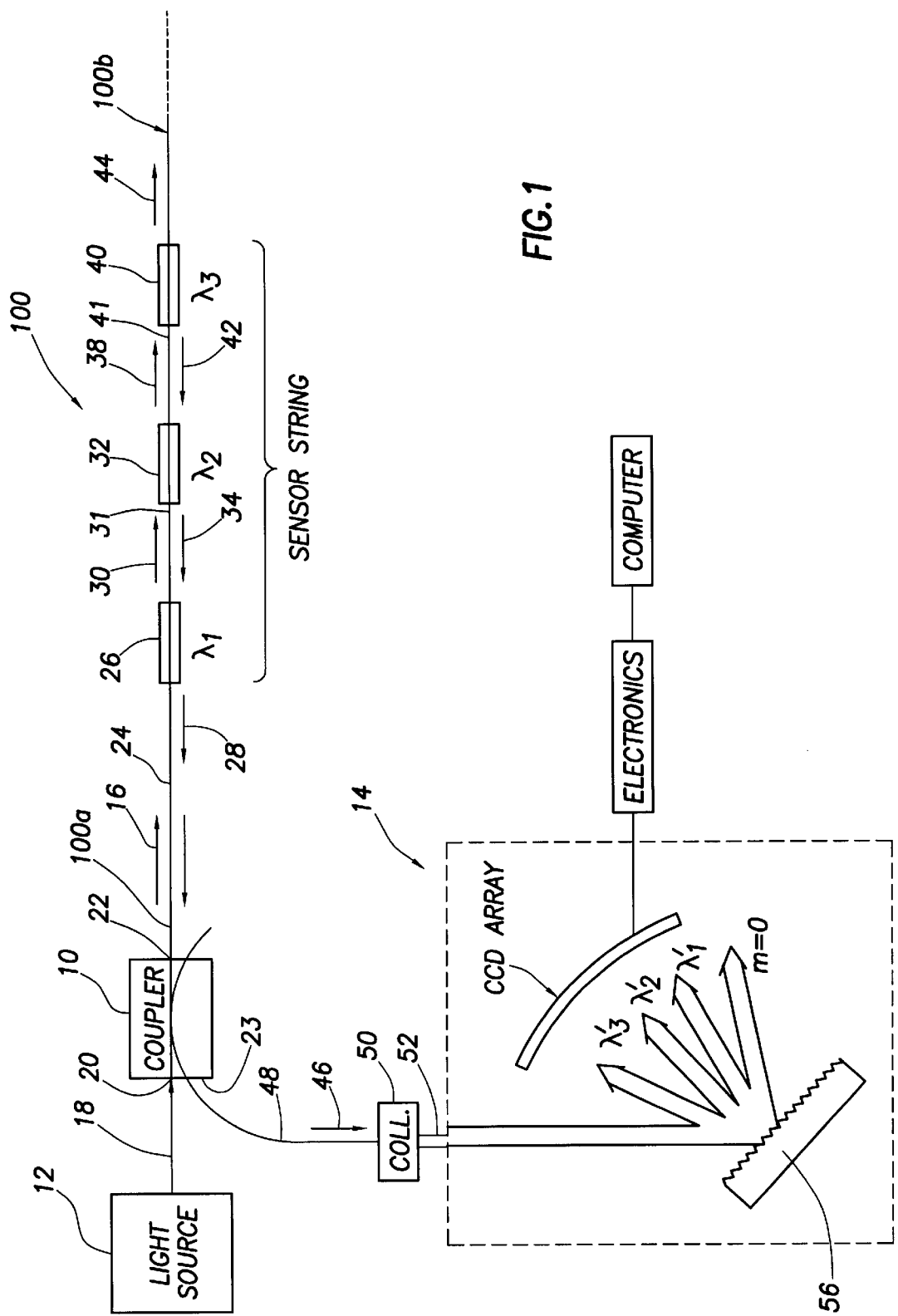

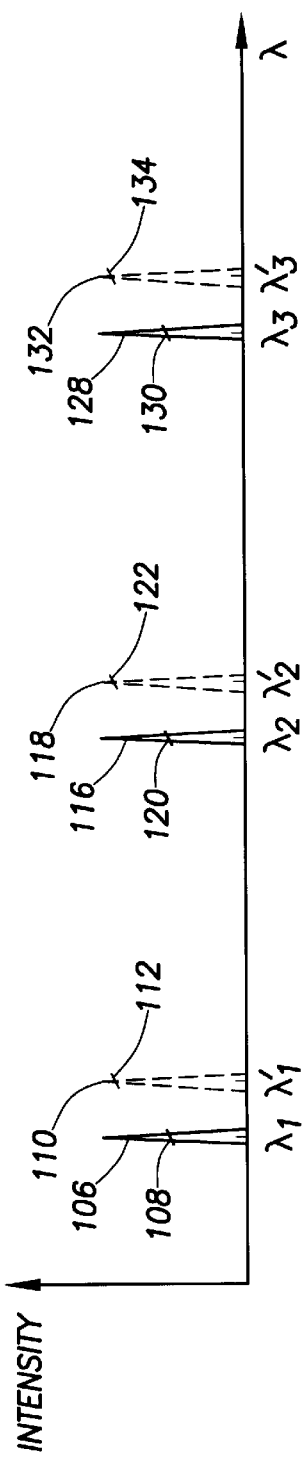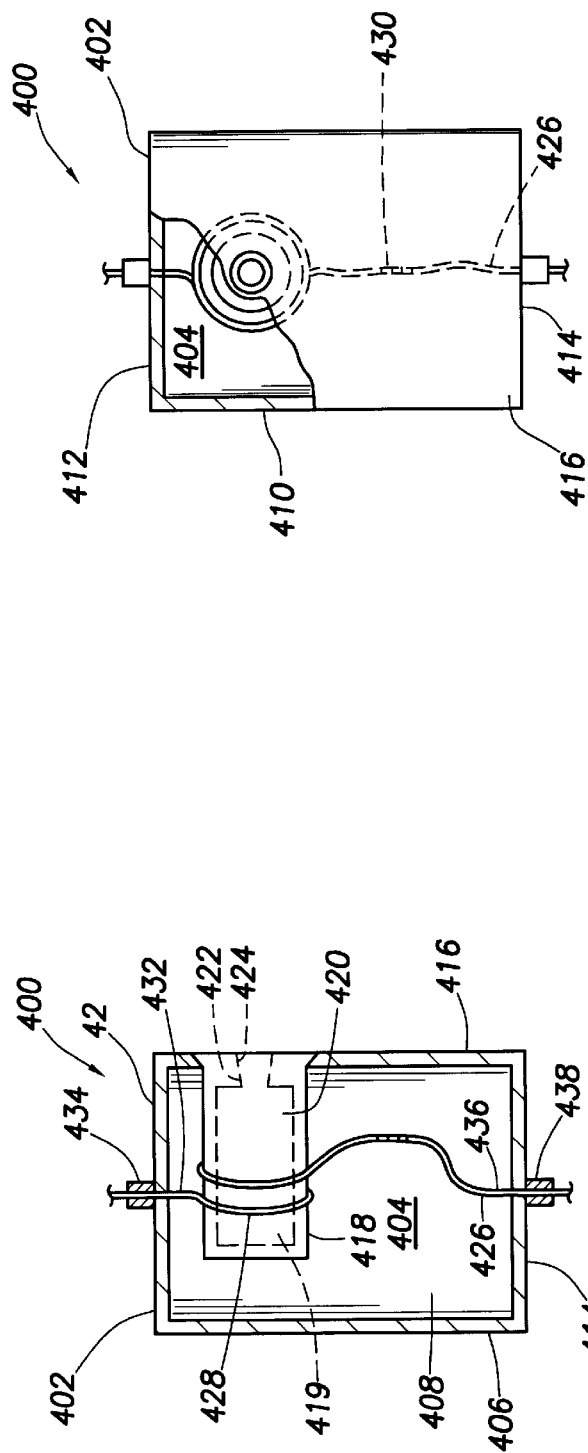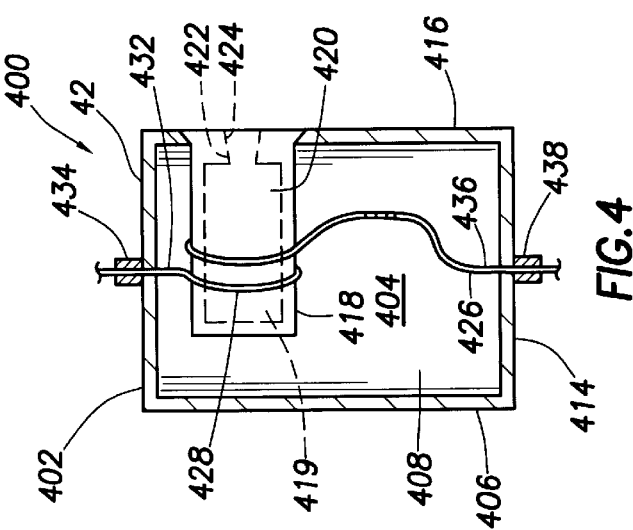

MULTIPLEXED FIBER OPTIC TRANSDUCER FOR USE IN A WELL AND METHOD

TECHNICAL FIELD

The present invention relates to a fiber optic transducer for combined pressure, temperature, and strain measurements, and in particular to multiple sensors arranged in a convoy fashion to provide multiplexed measurements in a downhole environment.

BACKGROUND OF THE INVENTION

Sensors have been used in downhole environments to detect and measure pressure, strain, temperature and other well characteristics that indicate the production capability of the well. These sensors have typically been constructed using piezoelectric and ferroelectric components that are reactive to pressure and temperature characteristics, and have been within the bore of downhole tools to monitor these conditions. Once the measurements are completed, then the downhole tools are retrieved and the data retrieved for analysis of the downhole conditions. This process of retrieving data is time consuming and also requires stopping well production. This time translates into lost profits and increased operational costs of the well.

Pressure, temperature, flow, and water cut are fundamental measurements for the management of producing wells. In deepwater operations and high producing horizontal/multilateral wells, these measurements take on an increased significance. Oil producers have been incurring costs to monitor wells in these complex oil well environments using antiquated technology.

For example, sensors have been developed and deployed to remain downhole to monitor conditions in producing wells. These sensors, however, are single-point electronic sensors that are very expensive and have a mean-time-to-failure much lower than optimal. As a result, and despite the full complement of sensors, the majority of a well structure after a short time is monitored by less than the complement of sensors.

As an advance in sensor technology, Bragg grating technology has emerged as an alternative to single-point sensors due to its fiber optic sensing transducer capability. Due to their narrowband wavelength reflection, they can be multiplexed in a fiber optic network. Nevertheless, such sensors can be susceptible to the hostile downhole environments, and, as a consequence, fail to operate for a time far shorter than the producing life of a well. Thus, a need exists for simplified optical sensors that have a robust housing to withstand the large magnitude forces downhole while still sufficiently yielding to reliably sense the environment conditions.

SUMMARY OF THE INVENTION

Accordingly, provided is an optic sensor for use in a well. The sensors can be configured to sense downhole temperature conditions, pressure conditions, or stress conditions, either individually or in combination. The optic sensor has a sensor housing that defines a chamber. The sensor housing also defines a region that is responsive to an external force such as pressure, stress, or temperature. An optic fiber extends through the housing. The optic fiber has a dielectric boundary that resides within the housing chamber, and has a refractive index variation that provides maximum reflectivity at a central reflectivity wavelength, the central reflectivity wavelength correspondingly shifting with respect to an expansion or contraction of the region.

In a further aspect of the invention, the optic fiber has a second dielectric boundary spaced apart from the first dielectric boundary. The second dielectric boundary is within the chamber and has a refractive index variation that provides maximum reflectivity at a central reflectivity wavelength sufficiently dissimilar to the first dielectric boundary. The second dielectric boundary floats in the cavity such that the second dielectric boundary is responsive to a temperature change within the sensor housing.

BRIEF DESCRIPTION OF THE DRAWINGS

The accompanying drawings are incorporated into and form a part of the specification to illustrate examples of the present invention. The drawings together with the description serve to explain the principles of the invention. The drawings are only included for purposes of illustrating preferred and alternative examples of how the inventions can be made and used and are not to be construed as limiting the inventions to only the illustrated and described examples. Various advantages and features of the present inventions will be apparent from a consideration of the drawings in which:

FIG. 1 is a schematic representation of a sensor string of the present invention;

FIG. 2 is a reflectivity profile of three Bragg grating sensors superimposed on the wavelength response of a rectangular optical band pass filter in accordance with the present invention;

FIG. 4 is a cross-sectional side plan view of the optic sensor of the present invention having a housing with a pressure responsive element, the sensor shown for pressure and temperature measurements in a downhole environment;

FIG. 5 is a partial cross-sectional front plan view of the optic sensor configuration depicted in FIG. 4.

DETAILED DESCRIPTION OF A PREFERRED EMBODIMENT

Figure 6:
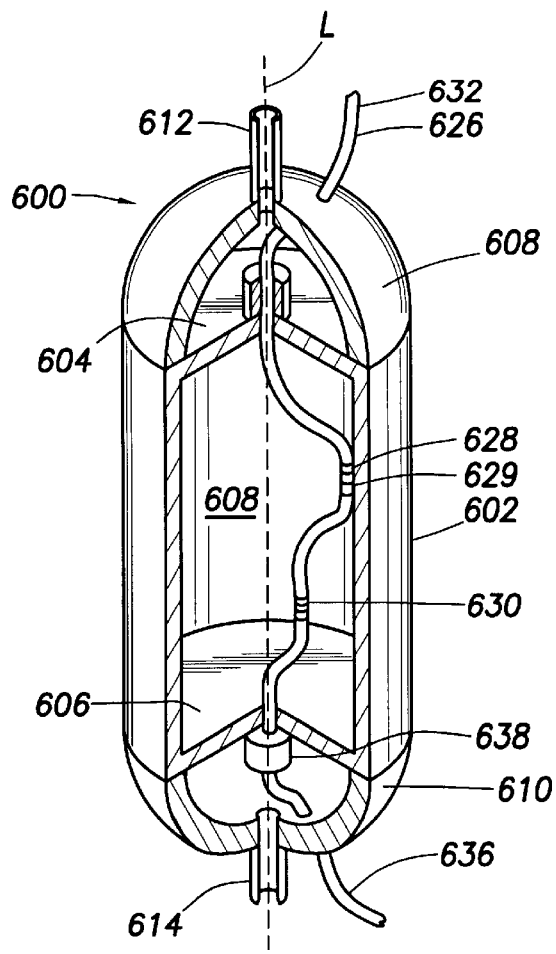
FIG. 6 is a perspective view of the optic sensor of the present invention another embodiment of an optic sensor 600 configured for temperature and strain measurements in a downhole environment.

The principles of the present invention and their advantages are best understood by referring to the illustrated embodiment depicted in the FIGURES, in which like reference numbers describe like parts.

FIG. 1 is a schematic representation of a sensor string of the present invention generally designated by the numeral 100. For clarity, the sensors are represented by the Bragg gratings of the sensor, as the reflection of these gratings in the presence of an incident light source depicts the presence of physical stresses on the sensor devices. Further detail regarding the sensors is discussed in detail below.

The sensor string 100 is coupled through an optical coupler 10 to a light source 12 and a spectrometer 14. The light source 12 is preferably a superluminescent diode driven by an direct -current ("DC") signal to provide a broadband light source 12 onto an optic fiber 18.

The broadband light source 16 travels along the optical fiber 18 to a first port 20 of the coupler 10 and exits the coupler 10 from a second port 22 and propagates along an optic fiber 24.

The broadband light source 16 is incident on a Bragg grating 26 having a central reflectivity wavelength $\lambda_1$. A Bragg grating is a periodic refractive index variation in the core of an optical fiber that reflects a narrow wavelength band of light, and has a maximum reflectivity at a central reflectivity wavelength, and transmits all other wavelengths. Thus, when the broadband light source signal 16 is incident on the Bragg grating 26, a narrow wavelength band of light 28 having a central wavelength $\lambda_1$ is reflected and light not reflected is transmitted through the Bragg grating 26 as indicated by a line 30.

The light 30 is incident on a second Bragg grating 32 in the fiber 31 having a central reflectivity wavelength $\lambda_2$. A narrow wavelength band of light 34, having a central wavelength $\lambda_2$, is reflected from the second Bragg grating 32. Light 38 not reflected as the bands of light 28 and 34 are transmitted to a third Bragg grating 40 having a central reflectivity wavelength $\lambda_3$. The third Bragg grating 40 reflects a narrow wavelength band of light 42 having a central wavelength $\lambda_3$ and transmits the remaining wavelengths of light not included in the reflected signals 28, 34, and 42, as indicated by line 44. The signal 44 may then be incident on more Bragg gratings, each producing a respective reflected signal. Any number of gratings along a given fiber may be used to provide a sensor string. That is, a sensor string with a cumulative total of about ten (10) Bragg gratings can be implemented over a continuous fiber without appreciable attenuation of the light source 16. It should be noted that this number is limited by the physical characteristics of the fiber optic cabling used. It should be noted, however, that the total of Bragg gratings that can be implemented are a function of the bandwidth, the spectral content of the light source 12, the width of the reflected spectrum from each fiber, and the measurement range of the gratings in each of the sensors. As the transmission characteristics such as signal bandwidth increases and signal attenuation decreases, then the number of Bragg gratings that can be implemented in the sensor string similarly increase.

Each of the reflected signals 28, 34, and 42 travels along the fiber 24 to the coupler 10. The reflected signals are collectively indicated by the line 46. The reflected signals 46 re-enters the coupler 10 at the second port 22 and exits at the third port 23. The collective signal 46 propagates along an optic fiber 48 to an optical collimator 50 that converts the light signal 46 in the fiber 48 into a collimated beam 52 that exits the collimator 50.

The collimated beam 52 is incident upon an optical-to-electronic spectrum analyzer on the spectrometer 14. The spectrometer 14 is preferably a diffraction-grating-based optical spectrum analyzer because such analyzers provide a greater separation of wavelengths, with less attenuation, allowing for better wavelength resolution. Suitable spectrum analyzers are commercially available under the part number HP 71450B from Hewlett-Packard of Englewood, Calif.

The spectrometer 14 has a diffraction grating 56, which is a mirror with grooves on its surface. The spacing between grooves is extremely narrow, of the same order of magnitude of the wavelengths of interest. When the collimated beam "strikes" the diffraction grating, the light is reflected in separate directions, providing multiple-order beams encompassing the wavelength of the light source 12. A CCD ("Charge Coupled Device") array 57 senses the reflected multipleorder beams. The sensed beams are then processed and recorded in a microcomputer circuit 59 coupled to the array 57. The first reflection is called the zero-order beam (m=0), and it reflects in the same direction as it would if the diffraction grating 56 were replaced with a plane mirror. This beam is not separated into different wavelengths and is not used by the optical spectrum analyzer.

Referring now to FIG. 2, the Bragg grating sensor 26 (FIG. 1) has a reflectivity profile 106 centered at the wavelength $\lambda_1$,. The reflectivity profile 106 also indicates the wavelength spectrum of reflected light 28 (FIG. 1), which is a part of the collimated light 52 incident on filter 56.

As discussed above, when a strain or other perturbation is applied to the Bragg grating 26, the spatial periodicity of the refractive index variation changes (along with the average index of refraction), thereby shifting the central (or peak) wavelength of the Bragg grating reflectivity profile. For example, when a given strain is applied to the Bragg grating 26, the profile 106 shifts to a different location as indicated by the sensor profile 110 having a central wavelength $\lambda_1$,.

Similarly, the Bragg grating sensor 32 has a reflectivity profile 116, which is centered at the wavelength 2. Upon introducing a perturbation, the central wavelength shifts, for example, to a profile 118 centered at a wavelength $\lambda_2$,.

The Bragg grating sensor 40 has a corresponding reflectivity profile 128, which is centered at the wavelength $\lambda_3$. Upon introducing a perturbation, the central wavelength shifts, for example, to a profile 132 centered at a wavelength $\lambda_3$,.

Figure 3:
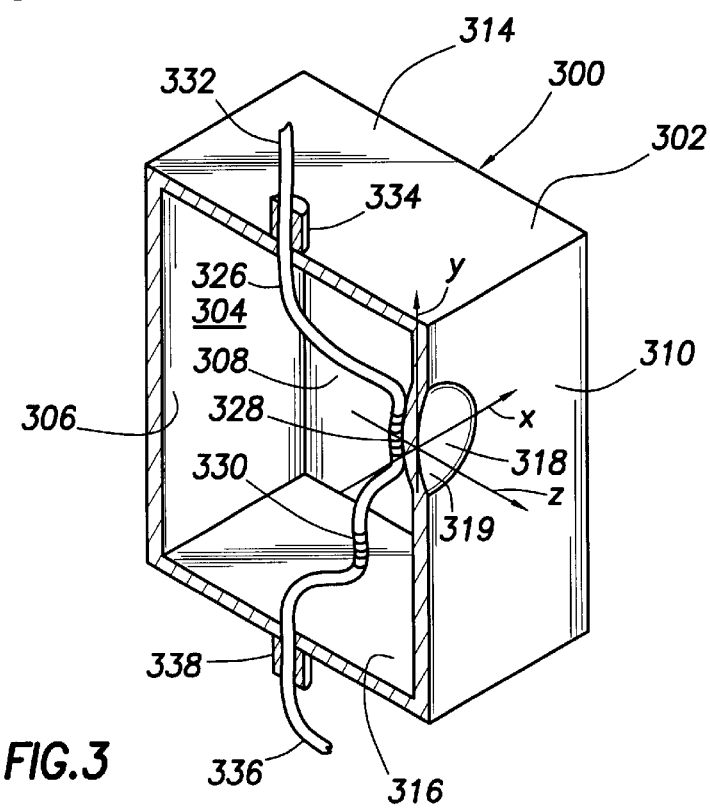
FIG. 3 is a cross-sectional, perspective view of the optic sensor of the present invention having a housing with a diaphragm, the sensor configured for pressure and temperature measurements downhole.

With respect to FIGS. 3 through 5, illustrated are embodiments of sensors implementing Bragg gratings for use in a downhole environment. With respect to the connection of these sensors downhole, the optic fiber 24 and sensor string 100 interconnects are carried with a downhole tubing string, such as through an autoclave tubing on the outside the string, or an electronics data and power path implemented with a Surface Controlled Reservoir Analysis and Management System ("SCRAMS") adapted to accommodate fiber optic cable. The SCRAMS is a commercially available product from Petroleum Engineering Services International ("PESI") of Aberdeen, Scotland.

Each of the sensors illustrated in FIGS. 3 through 5 are made of a durable, non-reactive material suitable for downhole conditions. An example of a suitable material is machine steel, or steel alloy, such as INCONEL 718, 316–304. Preferably, the sensor is made of INCONEL 718. With respect to the displacement on the Bragg gratings, sensors operating within the 1300 nanometer range and a single mode fiber made of silica with a germanium-doped core, the sensitivity is about one (1) nanometer change in wavelength for 1000 microstrains change in strain on the fiber. Furthermore, the average maximum strain in one direction (either tensile strain or compressive stain) that can be applied to without damaging the sensor would be approximately 10,000 microstrains. Thus, the maximum strain change that can occur for a Bragg grating is about 10 nanometers in one direction of ±10 nanometers around a central, unstressed-wavelength of the Bragg grating for both tensile and compressive strains. To minimize the potential for damage to the fiber, half of this strain range may be used.

The sensors described herein have a sensor housing that defines a chamber, and a region responsive to external forces. The responsive region can be configured for external forces such as pressure, strain, or compression forces.

With respect to the present invention, an optic fiber extends through the sensor housing. The optic fiber has at least one dielectric boundary. The boundaries are preferably provided by a Bragg grating. Additional downhole environment measurements can be made with the same housing by providing a second dielectric boundary defined in the optic fiber and spaced apart from the other dielectric boundary. In that case, each of the dielectric boundaries is within the chamber and the first dielectric boundary is in communication with the responsive region such that the boundary is strained with respect to deflection of the region.

In part, the responsive regions are provided by bonding the Bragg grating region of an optic fiber to a surface that is reactive to physical forces, such as temperature, strain, and pressure. The optic fiber is bonded to these reactive surfaces with a suitable adhesive such as having low creep, high resistance, non-brittle, and non-compliant. FIG. 3 is a cross-sectional, perspective view of an optic sensor 300 configured for to pressure and temperature measurements downhole. The sensor 300 has a housing 302. The housing 302 defines a pressure-sealed chamber 304 having a quadrilateral cross-section with a diameter of about one inch (about 2.54 centimeters). The housing side walls 306, 308, 310, and top and bottom walls 314 and 316, are preferably made of a unitary construction, and have a thickness suitable for withstanding pressure differentials of about 20,000 p.s.i. (about 137,880 kPa). It should be noted that the housing 302 may also have different cross-sectional areas, such as substantially-circular, allowing for cylindrical- or spherical-housings for the sensor 300. Formed in the side wall 310 is a diaphragm 318, which is preferably extruded from the surrounding side wall 310. Because the diaphragm 318 is extruded, the thickness of the diaphragm 318 is thinner than that of the surrounding wall, which causes the diaphragm 318 to be more sensitive or responsive to pressure differentials than the surrounding wall. The diaphragm 318 can be implemented with other pressure-sensitive structures, but preferably, due to sensitivity and manufacturing considerations, the diaphragm 318 has a substantially parabolic-shaped body 319 that extends into the chamber 304. The parabolic-shaped body has an axis of the paraboloid Z, and the side wall 310 provides a plane that defines the X- and Y-axes of the substantially parabolic-shaped body 319. The surface of the body 319 can be mathematically-defined as follows:

$$z = x^2 + y^2$$

where:
z is the axis of the paraboloid;
x is the horizontal axis of the paraboloid; and
y is the vertical axis of the paraboloid.
It should be noted that other curved surfaces can be used, such as a general spheroid shape. It can be readily appreciated by those skilled in the art that the diaphragm is provided as a relatively-thin portion of the wall that extends into the chamber 304. The diaphragm could extend outward respective to the chamber 304, taking into consideration the design the stresses and pressures that are exerted against this thinned region.

The diaphragm 318 is positioned adjacent the upper end of the side wall 310 toward the top wall. That is, because the relative pressure sensitivity of the diaphragm 318 is greater with respect to the housing 302, it is preferable that the diaphragm 318 is positioned adjacent a substantially rigid structure that would limit the overall deflection of the side wall 310 caused by differential pressure forces deflecting the diaphragm 318. Positioning the diaphragm in this manner helps stabilize the structure of the housing 302. It should be readily appreciated that the diaphragm 318 can be positioned adjacent the other walls 306, 308, or 314.

An optic fiber 326 has a first and a second Bragg grating 328 and 330 with associated central wavelengths $\lambda_1$ and $\lambda_2$, respectively. The first Bragg grating 328 is bonded to the interior surface of the diaphragm 318 such that expansion or contraction of the diaphragm 318 is communicated to the first Bragg grating 328. The physical expansion or contraction of the diaphragm causes a spatial periodicity of the refractive index variation to change (along with the average index of refraction), thereby shifting the central (or peak) wavelength $\lambda_1$ of the Bragg grating reflectivity profile. The second Bragg grating 330 floats in the chamber 304. The term "floats" as used herein means that the grating is not directly bonded to any interior surface of the housing 302. That is, the grating 330 is not adhered to a surface of the housing 302, but can be suspended within the cavity 304 in a stabilizing solution, or positionally-stabilized with mountings extending into the cavity 304, or the like.

As shown in FIG. 3, the optic fiber 326 has a first end 332 connected to a coupling 334, and a second end 336 connected to a second coupling 338. The couplings 334 and 338 secure the optic fiber 326 with respect to the housing 302 such that tensile forces arising from suspension of the sensor string 100 (see FIG. 1) are conveyed through the housing and not through the optic fiber portion within the housing 302. Because the Bragg grating 330 is floating in the chamber 304, the grating is responsive to the temperature in the chamber 304 represented by the longitudinal contraction and expansion of the fiber 326 through the Bragg grating 330. That is, the refractive index of the grating also changes with temperature, and the temperature sensitivity of the sensor arises in the chamber 304.

FIGS. 4 and 5 illustrate another embodiment of an optic sensor 400 configured for pressure and temperature measurements in a downhole environment. The sensor 400 has a housing 402. The housing 402 defines a pressure-sealed chamber 404 having a size sufficient to sense the perturbations within the downhole environment. The size of the housing can be reduced to within manufacturing techniques available, yet allow perturbations to be registered with the respective Bragg grating sufficient to detect a shift in the central reflectivity wavelengths of the Bragg grating.

The housing side walls 406, 408, and 410, and top and bottom walls 412 and 414, are preferably made of a unitary construction, and have a thickness suitable for withstanding pressure differentials of about 20,000 p.s.i. (137,880 kPa).

It should be noted that the housing 402 may also have different cross-sectional areas, such as substantially-circular, allowing for cylindrical- or spherical-housings for the sensor 400.

Extending from a side wall 416 into the chamber 404 is a pressure vessel 418. The pressure vessel 418 has a generally cylindrical body 420 defining a pressure chamber 419 having a narrowed inner portion or a neck 422. From the neck 422, a diffuser portion 424 flares outward toward the side wall 416, exposing the chamber 404 of the cylindrical body 420 to the exterior of the housing 402. The neck 422 can be threaded to matingly-receive an autoclave or other port member to provide pressure measurements distal from the sensor 400.

The pressure vessel wall thickness is sufficient to allow radial contraction or expansion of the vessel in the presence of pressure differentials between the chamber 404 and the pressure chamber 419, while withstanding pressure differentials of about 20,000 p.s.i. (137,880 kPa).

An optic fiber 426 has a first and a second Bragg grating 428 and 430 with associated central wavelengths $\lambda_1$ and $\lambda_2$, respectively. The first Bragg grating 428 is looped around the pressure vessel 418 and is bonded to the vessel surface such that radial expansion or contraction of the pressure vessel 418 is communicated to the first Bragg grating 428 such that the spatial periodicity of the refractive index variation changes (along with the average index of refraction), thereby shifting the central (or peak) wavelength $\lambda_1$ of the Bragg grating reflectivity profile. The optic fiber 426 is bonded to the surface of vessel 418 with a suitable adhesive, as discussed above.

The second Bragg grating 430 floats in the chamber 404 in that it is not directly bonded to any interior surface of the housing 402. As shown in FIGS. 3 and 4, the optic fiber 426 has a first end 432 connected to a coupling 434, and a second end 436 connected to a second coupling 438. The couplings 434 and 438 secure the optic fiber 426 with respect to the housing 402 such that tensile forces arising from suspension of the sensor string 100 (see FIG. 1) are conveyed through the housing and not through the optic fiber portion within the housing 402. Because the Bragg grating 430 is floating in the chamber 404, the grating is responsive to the temperature in the chamber 404 represented by the longitudinal contraction and expansion of the fiber 426 through the Bragg grating 430.

FIG. 6 is a perspective view of another embodiment of an optic sensor 600 configured for temperature and strain measurements in a downhole environment. The sensor 600 has a generally cylindrical housing 602 having a top portion 604 and a bottom portion 606 that define a longitudinal cavity 608.

Secured about and adjacent the top portion 604 is of the housing 602 is a top cap 611. Secured about and adjacent the bottom portion 606 is a bottom cap 610. The top cap 611 and the bottom cap 610 are secured to the housing 602 such that a majority of tensile forces are communicated through the housing 602 and not through the top portion 604 and the bottom portion 606 of the sensor.

The top cap 611 and the bottom cap 610 are secured to the cylindrical housing 602 by welding, adhesives, mating threads, or the like. Preferably, the top cap 611 and the bottom cap 610 are secured to the cylindrical housing 602 by seam welding techniques due to the ability to maintain a connection with the housing 602 under tensile forces exerted to the top and the bottom caps and 610.

The top cap 611 has a force member 612 longitudinally-extending from the top cap 611 and aligned about a longitudinal axis L of the housing 602. The bottom cap 610 has a force member 614 extending from the bottom cap 610 and aligned about the longitudinal axis L of the housing 602. The force members 612 and 614 are secured to the caps 611 and 610 such that tensile forces of the magnitude of 100,000 force-pounds (about 444,800 Newtons) can be communicated to the caps and the housing 602. The force members can be secured using an enlarged anchor on the interior of the cap or through welding, adhesives, or the like. Preferably, the force members are secured by welding an enlarged flange extending from the members to the interior of the respective cap.

An optic fiber 626 has a first and a second Bragg grating 628 and 630 with associated central wavelengths $\lambda_1$ and $\lambda_2$, respectively. The first Bragg grating 628 is bonded to the interior vessel surface 629 such that longitudinal expansion or contraction of the pressure vessel 602 is communicated to the first Bragg grating 628. In turn, the spatial periodicity of the refractive index variation of the grating changes (along with the average index of refraction), thereby shifting the central (or peak) wavelength $\lambda_1$ of the Bragg grating reflectivity profile. The optic fiber 626 is bonded to the surface of vessel 608 with a suitable adhesive, as discussed above.

The second Bragg grating 630 floats in the chamber 608 in that it is not directly bonded to any interior surface of the housing 602. As shown in FIG. 6, the optic fiber 626 has a first end 632 connected to a coupling 634, and a second end 636 connected to a second coupling 638. The couplings 634 and 638 secure the optic fiber 426 with respect to the housing 602 such that tensile forces arising from suspension of the sensor string 100 (see FIG. 1) are conveyed through the housing and not directly through the optic fiber portion within the housing 602. Because the Bragg grating 630 is floating in the chamber 608, the grating is responsive to the temperature in the chamber 608 represented by the longitudinal contraction and expansion of the fiber 626 through the Bragg grating 630.

The sensor illustrated in FIG. 6 can be further simplified for incorporation into a downhole tool. For example, the housing 602 can be provided by the tool body, and the Bragg grating 628 can be directly adhered to the inner surface of the tool. In this configuration, the end caps 608 and 610 can be removed from the structure.

Accordingly, the sensors 300, 400, and 600, are deployable in a downhole environment, and interconnected through a SCRAMS or autoclave so that the downhole environment can be monitored such that appropriate actions can be promptly taken to increase the overall productivity of a petroleum reservoir. The combination of these components provide a sensor architecture that is capable of a long time span, and also is resilient to the environment while also capable of providing reliable sensor information that is conveyable to the surface of the reservoir site.

It should be readily appreciated that the additional, or remnant wavelengths can be available for examination and analysis. That is, the remnant wavelengths are wavelengths not allotted to sensors deployed in the sensor string 100, or are wavelengths that are otherwise allotted but pass through the sensor string 100. Such information provides a feed back path for further ensuring the operability of the string and the ready detection of errors. In essence, the sensor string 100 would be a dual path way, with a first end 100a coupled to the light source 12, and a second end 100b returning after the last sensor in the string to convey the remaining light source energy to the surface that is not otherwise reflected to the first end.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It is therefore contemplated that the claims will cover any such modifications or embodiments that fall within the true scope and spirit of the invention.

What is claimed is:

1. A downhole optical sensor comprising:
   a sensor housing defining a chamber dimensioned to register perturbations and having a region responsive to an external force; and
   an optic fiber extending through said housing, said optic fiber having a dielectric boundary directly coupled to a surface of said region of said housing within said chamber and having a refractive index variation that provides maximum reflectivity at a central reflectivity wavelength, said central reflectivity wavelength correspondingly shifting with respect to an expansion or contraction of said region.

2. The downhole optical sensor of claim 1 wherein said region is a pressure element that is responsive to a pressure differential across said sensor housing.

3. The downhole optical sensor of claim 2 wherein said pressure element is a diaphragm.

4. The downhole optical sensor of claim 2 wherein said pressure element is a pressure vessel to allow radial contraction or expansion of the vessel in the presence of pressure differentials across said sensor housing.

5. The downhole optical sensor of claim 4 wherein said pressure vessel comprises:
   a generally cylindrical body defining a pressure chamber having a narrowed inner portion and a diffuser portion extending from said narrowed inner portion that flares outward such that an interior surface of said cylindrical body is in communication to the exterior of said sensor housing.

6. The downhole optical sensor of claim 1 wherein said region is a strain element that is responsive to a change of form of said housing caused by an exertion of an external tensile force to said sensor housing.

7. The downhole optical sensor of claim 1 wherein said optic fiber second dielectric boundary spaced apart from said first dielectric boundary, said second dielectric boundary being within said chamber and having a refractive index variation that provides maximum reflectivity at a central reflectivity wavelength sufficiently dissimilar to said first dielectric boundary, said second dielectric boundary floats in said cavity such that said dielectric boundary is responsive to a temperature change within said sensor housing.

8. The downhole optical sensor of claim 7 wherein said region is a pressure element that is responsive to a pressure differential across said sensor housing.

9. The downhole optical sensor of claim 8 wherein said pressure element is a diaphragm.

10. The downhole optical sensor of claim 8 wherein said pressure element is a pressure vessel to allow radial contraction or expansion of the vessel in the presence of pressure differentials across said sensor housing.

11. The downhole optical sensor of claim 10 wherein said pressure vessel comprises:
    a generally cylindrical body defining a pressure chamber having a narrowed inner portion and a diffuser portion extending from said narrowed inner portion that flares outward such that an interior surface of said cylindrical body is in communication to the exterior of said sensor housing.

12. The downhole optical sensor of claim 7 wherein said region is a strain element that is responsive to an external tensile force exerted against said sensor housing.

13. A downhole measurement system for optical sensors comprising:
    light source means for providing a continuous broadband light, said broadband light being launched into an optical waveguide;
    a sensor string having a plurality of optical sensors positionable in a downhole environment in communication with said broadband light, each of said sensors having a chamber dimensioned to register a perturbation and an optical fiber extending through said chamber and having a dielectric boundary coupled to a surface of said chamber to directly register the magnitude of a perturbation registered by said chamber, said dielectric boundary having a reflected light wavelength with a corresponding unique peak reflection wavelength associated with said broadband light, said reflection wavelength corresponding to the magnitude of a perturbation imposed upon a corresponding one of said chambers;
    means for collimating said reflected light from said sensors and for providing a collimated light;
    an optic filter for separating said corresponding unique peak reflection wavelength of each of said plurality of optical sensors, said optic filter having a passband with a monotonic region overlapping said reflection wavelength of said corresponding one of said sensors, said filter providing passed light transmitted a power related to the optical transmission of the optical filter at the sensor reflection wavelength; and
    a plurality means for optical detection, each of said detection means disposed in the path of said passed light of a corresponding one of said optical filters, each or detecting the power of said passed light, and each for providing an electrical output signal indicative of the power of said passed light, the magnitude of said perturbation on said corresponding one of said sensors.

14. A downhole sensor system comprising:
    a photonic sensor string extending through a chamber having at least one sensor between a first end and a second end of said sensor string, said at least one sensor having a Bragg grating directly coupled to a surface of said chamber of preselected dimensions and having a reflectivity profile responsive to a perturbation acting on said Bragg grating through said surface such that a spatial periodicity of said reflectivity profile changes, thereby shifting a central wavelength of said Bragg grating reflectivity profile;
    a light source having a plurality of wavelengths, said light source photonicallycoupled to said first end of said sensor string, said light source having at least one wavelength reflectively-corresponding to said Bragg grating; and
    a spectrometer photonically-coupled to said first end for detecting said reflectivity profile changes in said at least one wavelength.

15. The downhole sensor system of claim 14, wherein said spectrometer is coupled to said second end of said sensor string.

16. The downhole sensor system of claim 14 wherein said sensor comprises:
    a sensor housing defining a chamber and a region responsive to an external force, said central wavelength of said Bragg grating correspondingly shifting with respect to an expansion or contraction of said region.

17. The downhole sensor system of claim 16 wherein said region is a pressure element that is responsive to a pressure differential across said sensor housing.

18. The downhole sensor system of claim 16 wherein said region is a strain element that is responsive to a change of form of said sensor housing caused by an exertion of an external tensile force along a longitudinal axis of said sensor housing.

19. The downhole sensor system of claim 16 wherein said region is a cavity defined by said sensor housing, said Bragg grating responsive to a temperature affecting said cavity.

* * * * *